Dec. 8, 1931.  E. M. ALLEN  1,835,625
ELECTRICAL RELAY
Filed Dec. 5, 1930
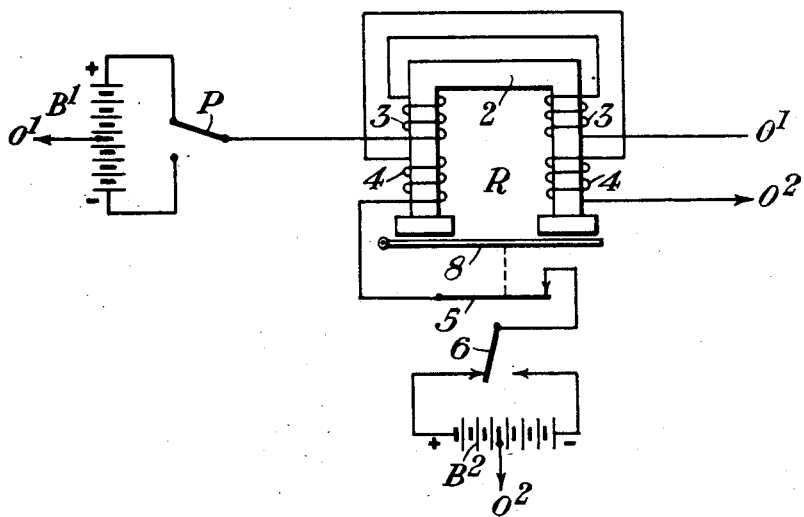
INVENTOR:
E. M. Allen,
BY A. R. Vincill
His ATTORNEY.

Patented Dec. 8, 1931

1,835,625

UNITED STATES PATENT OFFICE

EARL M. ALLEN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RELAY

Application filed December 5, 1930. Serial No. 500,308.

My invention relates to electrical relays, and particularly to direct current relays of the polarized type.

One feature of my invention is the provision of a relay of this type provided with a pick-up circuit, and also with a stick circuit including the polar armature, so that when the relay has once been energized in normal or reverse direction, a normal or reverse stick circuit will be closed whereby the relay will remain energized in such direction until the polarity of current supplied to the pick-up winding is changed.

I will describe one form of relay embodying my invention, and will then point out the novel features thereof in claims.

The accompanying drawing is a diagrammatic view showing one form of relay embodying my invention.

Referring to the drawing, the reference character R designates a relay having the usual magnetizable core 2, which carries two windings 3 and 4. Winding 3, which may be termed the "pick-up" winding, is provided with a circuit which includes a battery $B^1$ and a pole-changer P. When the pole-changer P is in the position shown in the drawing, current flows from the positive terminal of a battery $B^1$, through the pole-changer P and winding 3 to the middle terminal $O^1$ of the battery $B^1$. Current of what I will term "normal" polarity is then supplied to the winding 3, with the result that the polar armature contact 6 is swung to what I will term the "normal" position. At the same time the neutral armature is closed, so that front contact 5 is closed. Current of normal polarity is then supplied to the second winding 4, which I will term the "holding" winding, the circuit being from the positive terminal of a battery $B^2$, through polar contact 6 in its normal position, front neutral contact 5, and winding 4 to the middle point $O^2$ of battery $B^2$. It follows that relay R will continue to be energized in the normal direction even though pole-changer P be moved to its middle position or the circuit for winding 3 be opened at some other point.

I will now assume that with the parts in the positions in which they are shown in the drawing, the pole-changer P is reversed. Current will then flow from the middle point $O^1$ of battery $B^1$, through winding 3 and pole-changer P, to the negative terminal of this battery, so that current of reverse polarity will then be supplied to winding 3. The current in winding 3 will then oppose the current in winding 4, and if the voltages of the two batteries are the same, the flux in the core 2 will be reduced to zero. The neutral armature 8 will then open, so that front contact 5 will open the stick circuit for winding 4. The current of reverse polarity in winding 3 will then swing the polar armature contact 6 to its reverse position, and the neutral armature will again close. Winding 4 will then be supplied with current of reverse polarity, the circuit being from the middle point $O^2$ of battery $B^2$, through winding 4, front neutral contact 5, and polar armature contact 6 to the negative terminal of battery $B^2$. The relay will then continue to be energized in the reverse direction until pole-changer P is restored to its normal position.

The batteries $B^1$ and $B^2$ are not necessarily of exactly the same voltage. The voltages need only be sufficiently close to insure that when winding 3 is energized to reverse the relay, the flux in core 2 will be reduced to a sufficient amount to cause the neutral armature 8 to release.

The relay may be provided with other contacts operated by the neutral and polar armatures for the control of any suitable electrical circuits.

Although I have herein shown and described only one form of relay embodying my invention, it is understood that various changes and modifications may be made therein within the scope of the appended claims without departing from the spirit and scope of my invention.

Having thus described my invention, what I claim is:

1. In combination, a polarized relay having two operating windings on the same core as well as a neutral and a polar armature, means for supplying one winding with current of normal or reverse polarity to cause said polar armature to assume its normal or reverse position, and means for supplying the other winding with current of normal or reverse polarity according as said polar armature is in its normal or reverse position provided said neutral armature is closed.

2. In combination, a polarized relay having two operating windings on the same core as well as a neutral and a polar armature, means for supplying one winding with current of normal or reverse polarity to cause said polar armature to assume its normal or reverse position, a circuit for the other winding including a front contact operated by said neutral armature, and means for supplying said circuit with current of normal or reverse polarity according as said polar armature is in normal or reverse position.

In testimony whereof I affix my signature.

EARL M. ALLEN.